(12) United States Patent
Oquendo (10) Patent No.: US 12,103,600 B2
(45) Date of Patent: Oct. 1, 2024

(54) WIND DEFLECTION ASSEMBLY

(71) Applicant: Ali Oquendo, Valencia, CA (US)

(72) Inventor: Ali Oquendo, Valencia, CA (US)

( * ) Notice: Subject to any disclaimer, the term of this patent is extended or adjusted under 35 U.S.C. 154(b) by 346 days.

(21) Appl. No.: 17/742,145

(22) Filed: May 11, 2022

(65) Prior Publication Data
US 2023/0365201 A1 Nov. 16, 2023

(51) Int. Cl.
B62D 35/00 (2006.01)

(52) U.S. Cl.
CPC .................................. *B62D 35/001* (2013.01)

(58) Field of Classification Search
CPC ........ B62D 35/001; B62D 37/02; B60J 5/065; B60J 5/08
See application file for complete search history.

(56) References Cited

U.S. PATENT DOCUMENTS

| | | | |
|---|---|---|---|
| 4,486,046 A | 12/1984 | Whitney | |
| 4,518,188 A | 5/1985 | Witten | |
| D319,036 S | 8/1991 | Fingerle | |
| 5,078,448 A | 1/1992 | Selzer | |
| 6,085,825 A * | 7/2000 | Swink | E05F 15/67 160/133 |
| 8,033,594 B2 | 10/2011 | Nusbaum | |
| 8,517,452 B2 | 8/2013 | Kenevan | |
| 9,283,998 B2 | 3/2016 | Kibler | |
| 2010/0237647 A1* | 9/2010 | Whitehead | B62D 33/0222 296/29 |

FOREIGN PATENT DOCUMENTS

| | | | | |
|---|---|---|---|---|
| CA | 2851030 A1 | * | 11/2014 | ............ B60J 5/065 |
| CN | 209617312 U | * | 11/2019 | |
| CN | 111267977 A | * | 6/2020 | ............ B60R 13/06 |
| CN | 112172966 A | * | 1/2021 | |
| CN | 112208430 A | * | 1/2021 | ............... B60P 7/04 |
| CN | 113428245 A | * | 9/2021 | |
| CN | 214728452 U | * | 11/2021 | |
| CN | 214985699 U | * | 12/2021 | |
| CN | 215043181 U | * | 12/2021 | |
| CN | 217294218 U | * | 8/2022 | |
| DE | 102012006397 A1 | * | 10/2013 | ............ B60J 5/065 |
| DE | 102016103171 A1 | * | 8/2017 | ............ B60J 5/065 |
| DE | 102017001675 A1 | * | 8/2018 | ............ B60J 5/065 |
| DE | 102019201598 A1 | * | 8/2020 | ........... B65G 65/005 |

(Continued)

*Primary Examiner* — Lori Lyjak (57) ABSTRACT

A wind deflection assembly includes a curtain that is movably disposed on a semi-trailer. The curtain is comprised of a plurality of hinged sections and the curtain is positionable in a collapsed position or a deployed position. The hinged sections are oriented at an angle with each other thereby facilitating each of the hinged sections to deflect wind at an angle with the sidewall of the semi-trailer. In this way the curtain inhibits the semi-trailer from being blown over due to being exposed to a straight line lateral wind. A deploying mechanism is movably disposed on the semi-trailer. The deploying mechanism is in mechanical communication with the curtain and the curtain is urged in to the deployed position when the deploying mechanism is actuated into a deploying condition. Conversely, the curtain is urged into the collapsed position when the deploying mechanism is actuated into a retracting condition.

11 Claims, 7 Drawing Sheets

(56) References Cited

FOREIGN PATENT DOCUMENTS

| EP | 3015300 | A1 | * | 5/2016 | ............ | B60J 5/065 |
|----|---------|----|---|--------|--------------|------------|
| EP | 3197798 | B1 | * | 9/2021 | ............ | B60J 5/08 |
| GB | 2079684 | A | * | 1/1982 | ............ | B60J 5/065 |
| GB | 2126273 | A | * | 3/1984 | ............ | B60J 5/065 |
| WO | WO-0030882 | A1 | * | 6/2000 | ............ | B60J 5/062 |
| WO | WO2008051309 | | | 5/2008 | | |
| WO | WO-2010083557 | A1 | * | 7/2010 | ............ | B60J 5/065 |
| WO | WO-2010116155 | A1 | * | 10/2010 | ............ | B60J 5/065 |

* cited by examiner

WIND DEFLECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to deflection devices and more particularly pertains to a new deflection device for inhibiting a semi-trailer from being tipped over due to being exposed to a straight line wind. The device includes a curtain which is comprised of a plurality of hinged sections. The curtain is positionable in a stored position or a deployed position, and the plurality of hinged sections defines a saw-tooth pattern when the curtain is in the deployed position. The device includes a deploying mechanism for urging the curtain between the deployed position and the stored position.

(2) Description of Related Art Including Information Disclosed Under 37 CFR 1.97 and 1.98

The prior art relates to deflection devices including a deflector device that is mounted to a bottom of a semi-trailer which includes a plurality of vanes oriented at a strategic angle. The prior art discloses an air deflection device that includes a panel that extends between a semi-trailer and a semi-tractor for improving aerodynamics of the semi-trailer. The prior art discloses a variety of air deflection devices for closing a gap between a semi-trailer and a semi-tractor. The prior art discloses an air deflection device that is attached to a rear end of a semi-trailer for improving aerodynamics of the semi-trailer. The prior art discloses an air fairing device that is attachable to a bottom of a semi-trailer for improving aerodynamics of the semi-trailer.

BRIEF SUMMARY OF THE INVENTION

An embodiment of the disclosure meets the needs presented above by generally comprising a curtain that is movably disposed on a semi-trailer. The curtain is comprised of a plurality of hinged sections and the curtain is positionable in a collapsed position or a deployed position. The hinged sections are oriented at an angle with each other thereby facilitating each of the hinged sections to deflect wind at an angle with the sidewall of the semi-trailer. In this way the curtain inhibits the semi-trailer from being blown over due to being exposed to a straight line lateral wind. A deploying mechanism is movably disposed on the semi-trailer. The deploying mechanism is in mechanical communication with the curtain and the curtain is urged in to the deployed position when the deploying mechanism is actuated into a deploying condition. Conversely, the curtain is urged into the collapsed position when the deploying mechanism is actuated into a retracting condition.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
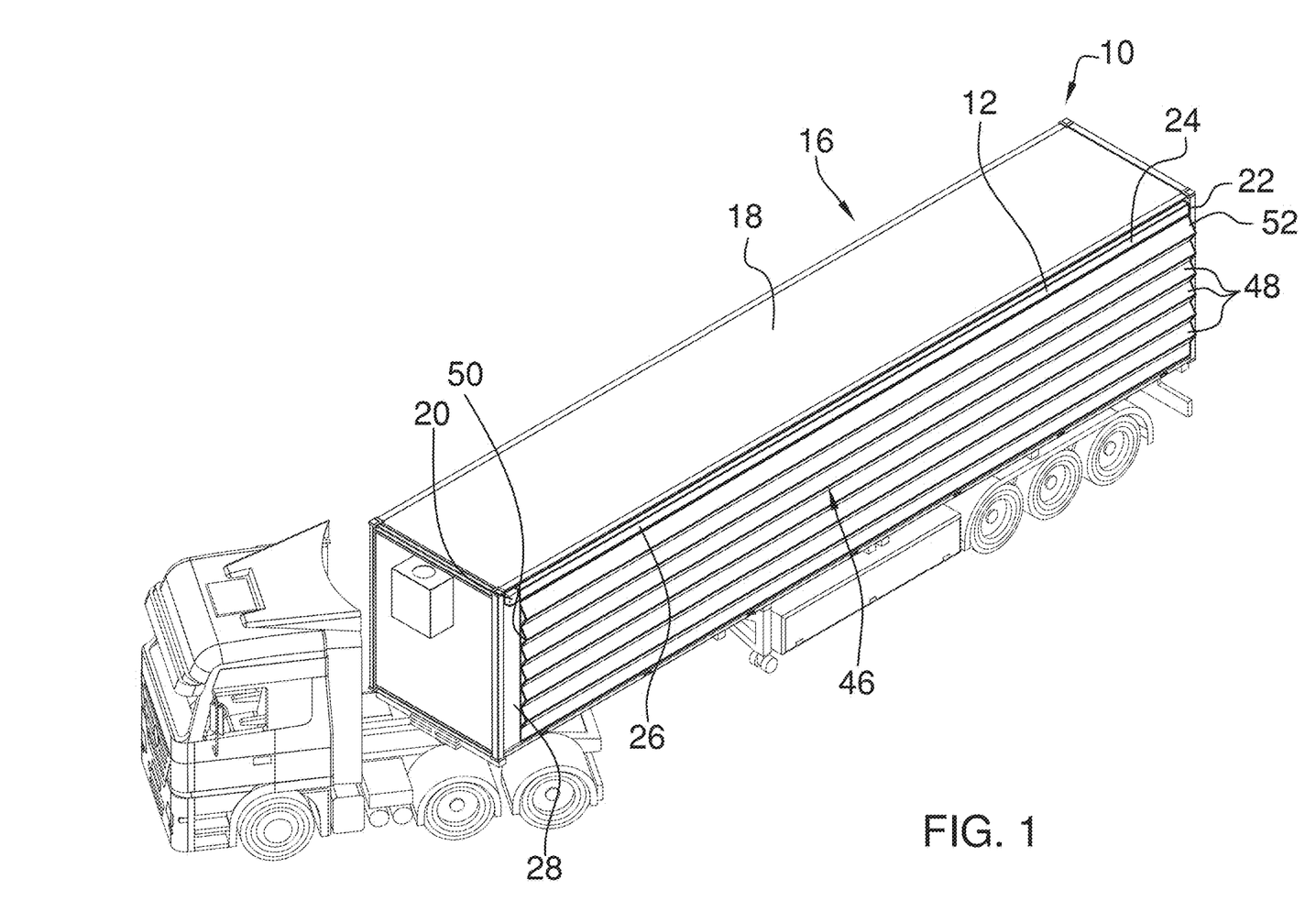
FIG. 1 is a perspective view of a wind deflection assembly according to an embodiment of the disclosure.
Figure 2:
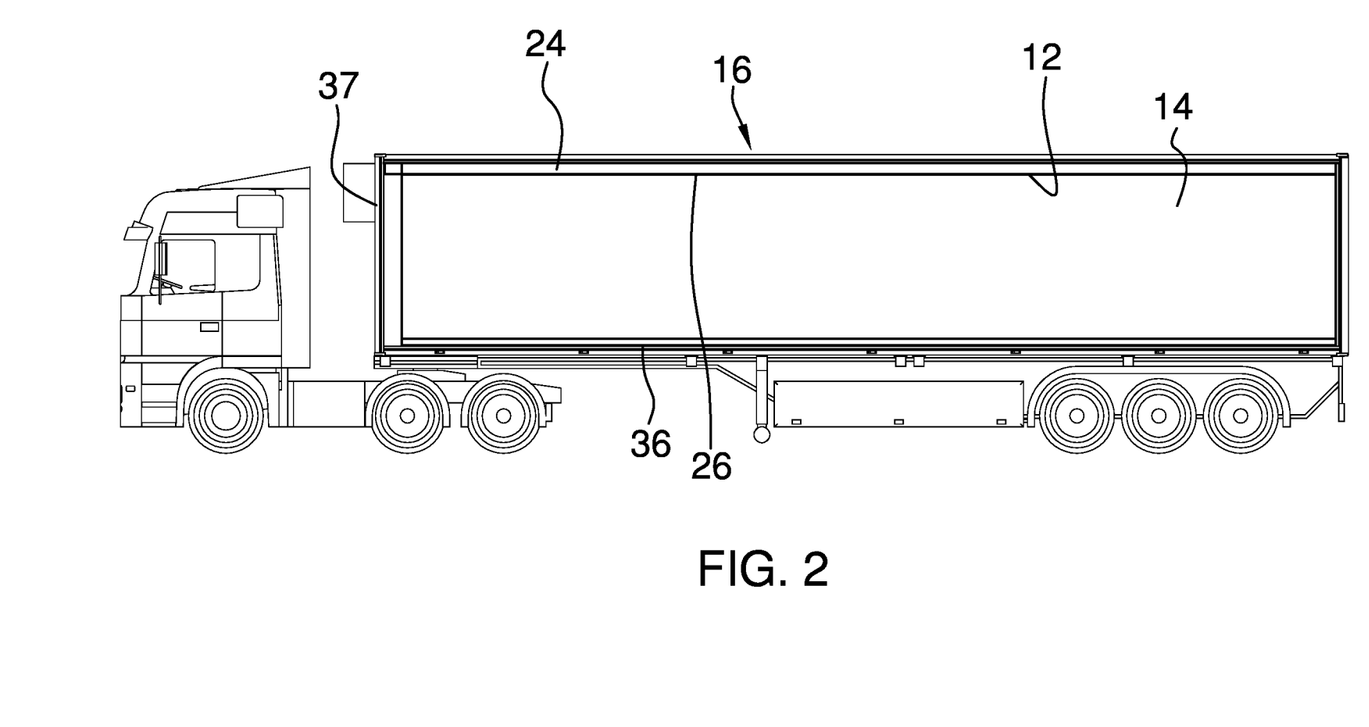
FIG. 2 is a left side view of an embodiment of the disclosure showing a curtain in a collapsed position.
Figure 3:
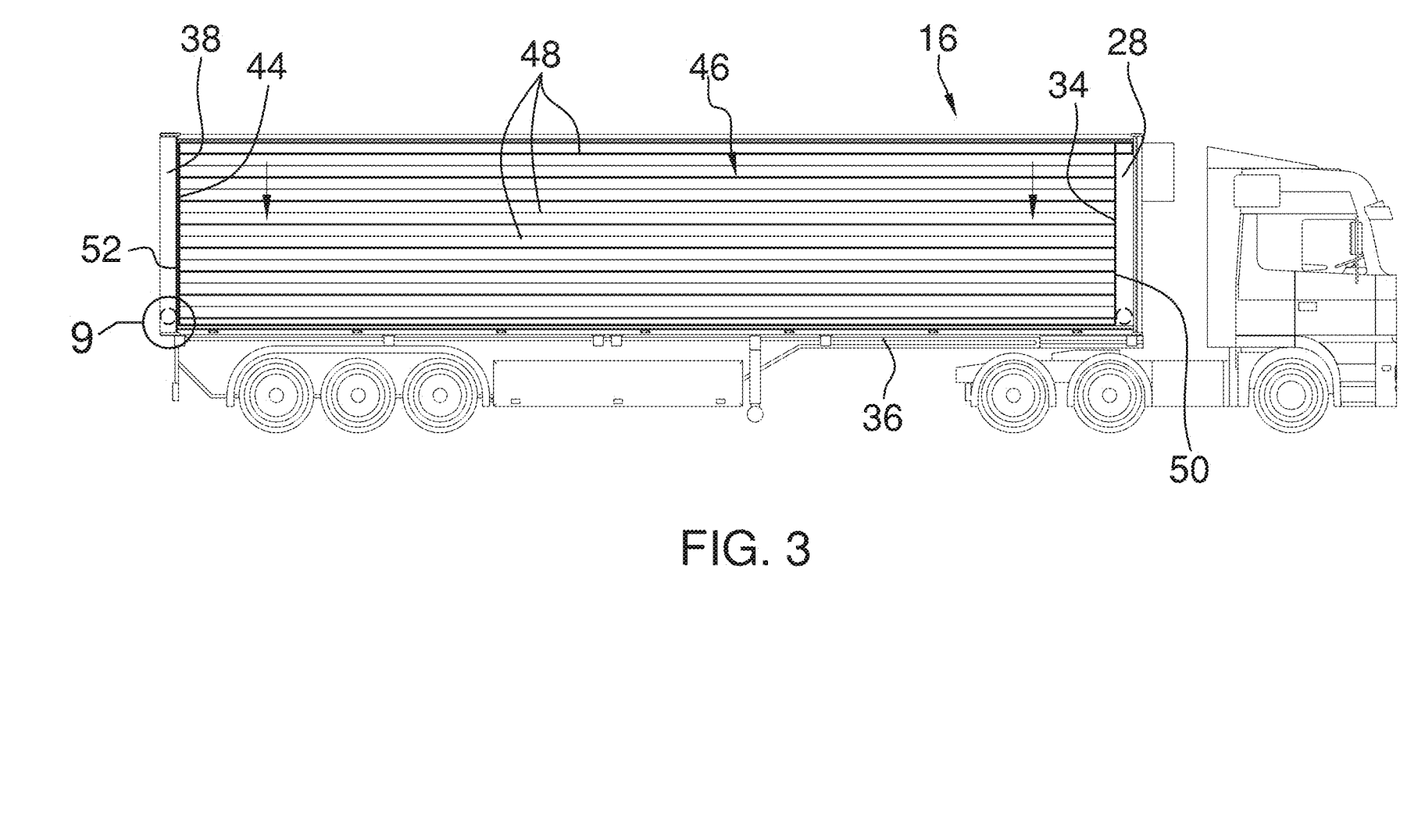
FIG. 3 is a right side view of an embodiment of the disclosure showing a curtain in a deployed position.
Figure 4:
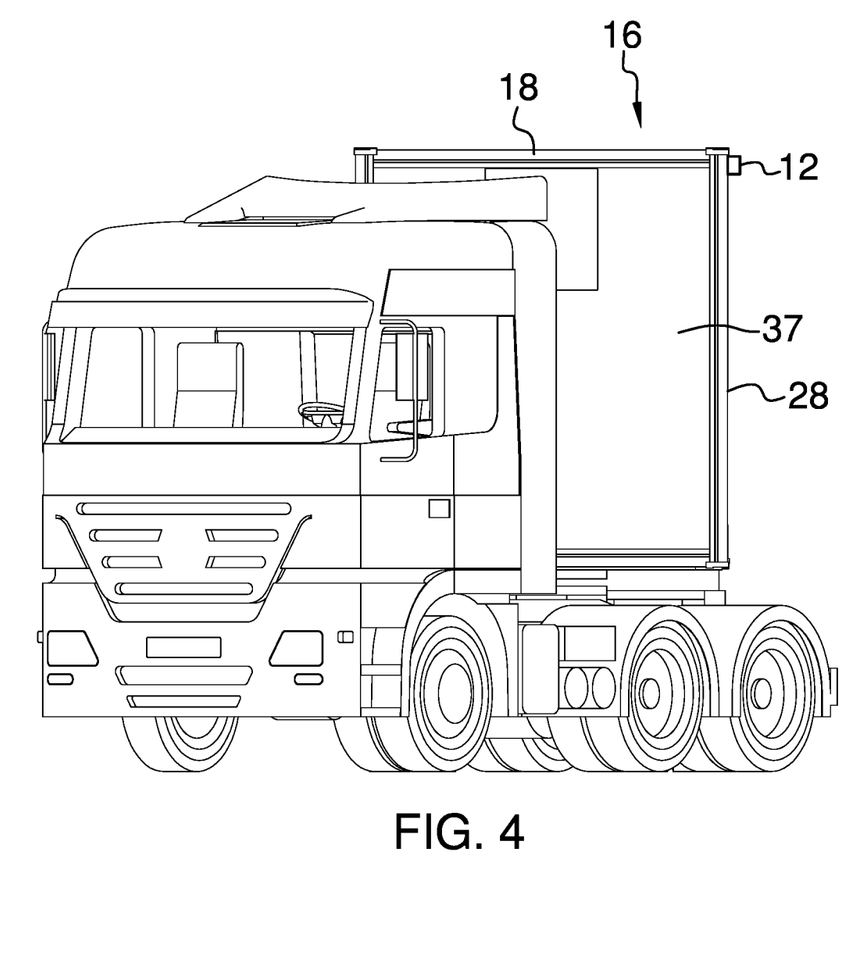
FIG. 4 is a front perspective view of an embodiment of the disclosure showing a curtain in a collapsed position.
Figure 5:
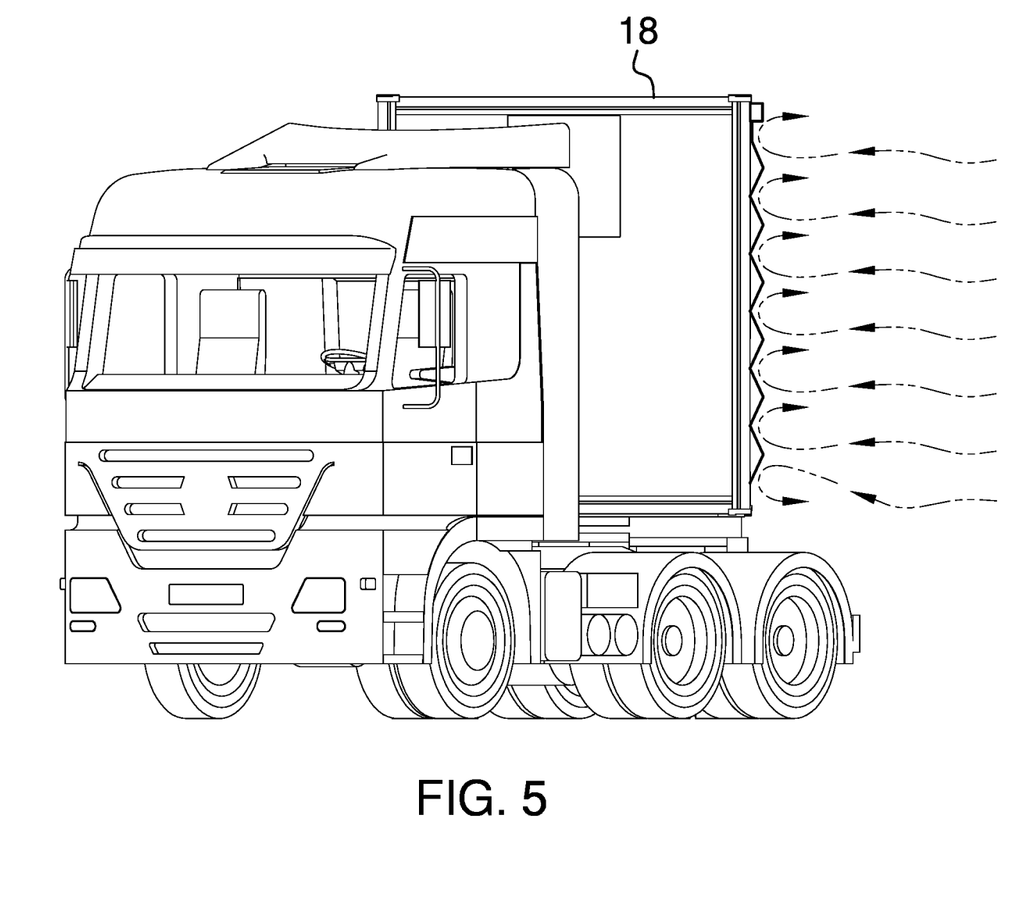
FIG. 5 is a front perspective view of an embodiment of the disclosure showing a curtain in a deployed position.
Figure 6:
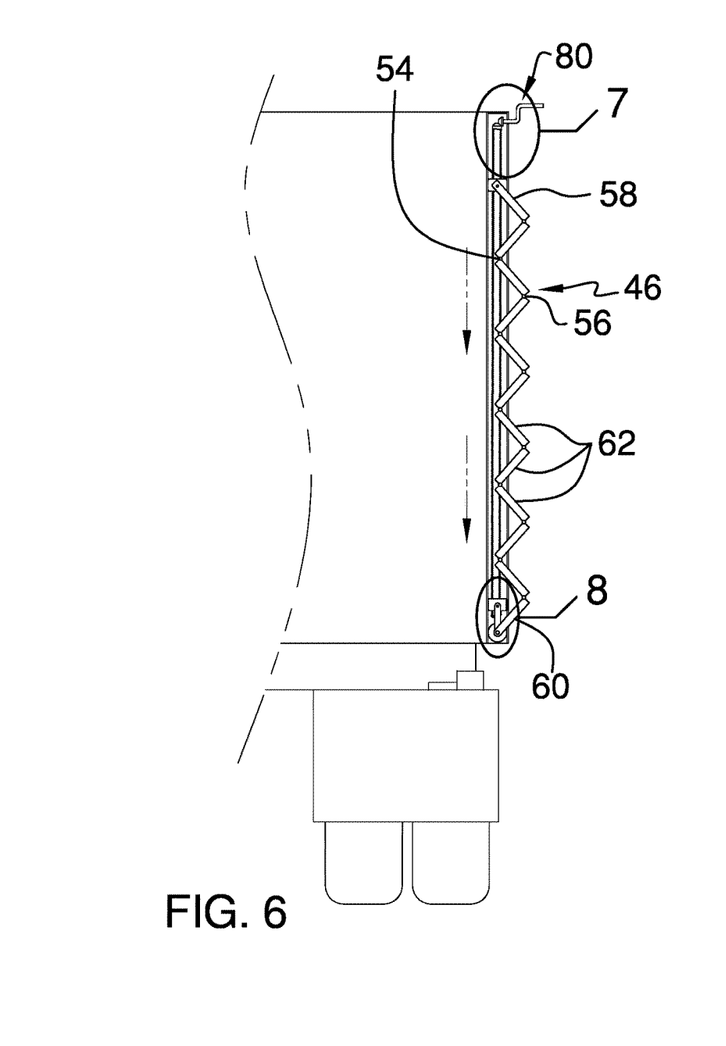
FIG. 6 is a front cut-away view of an embodiment of the disclosure showing a curtain in a deployed position.
Figure 7:
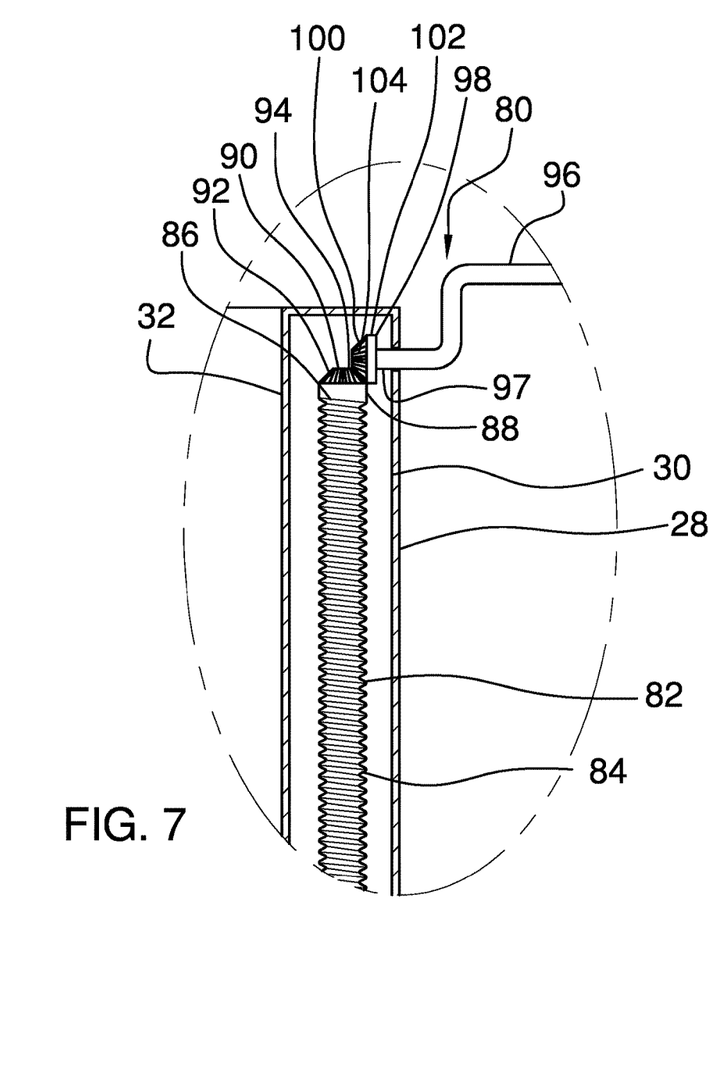
FIG. 7 is a detail view taken from circle 7 of FIG. 6 of an embodiment of the disclosure.
Figure 8:
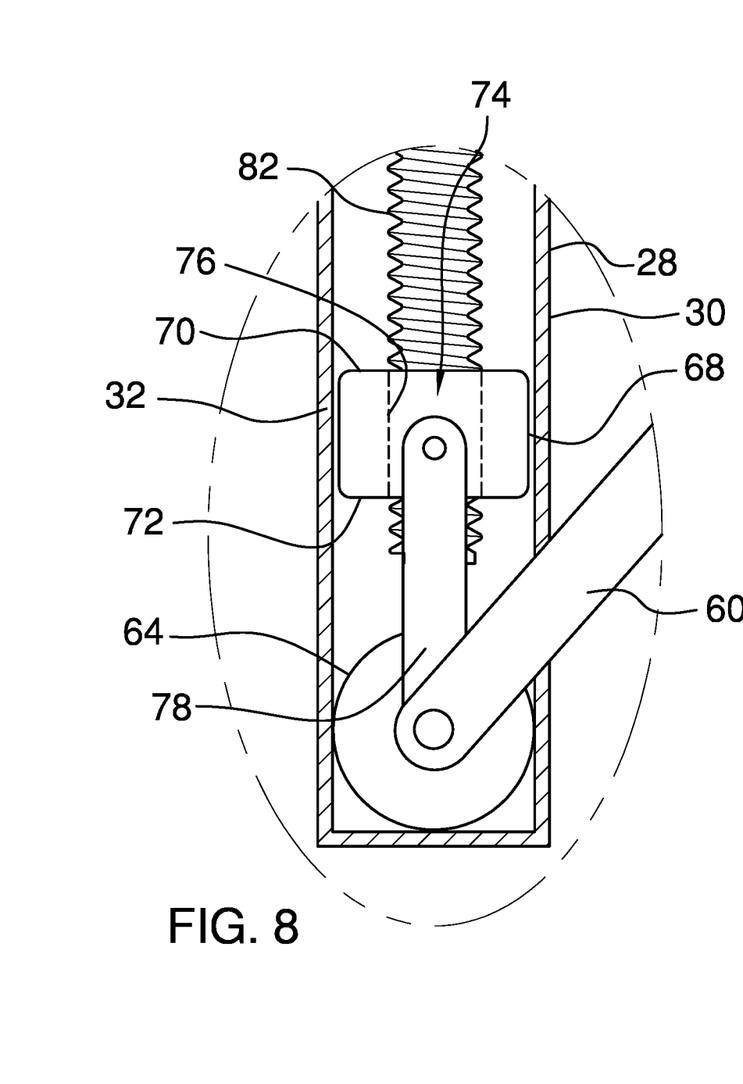
FIG. 8 is a detail view taken from circle 8 of FIG. 6 of an embodiment of the disclosure.
Figure 9:
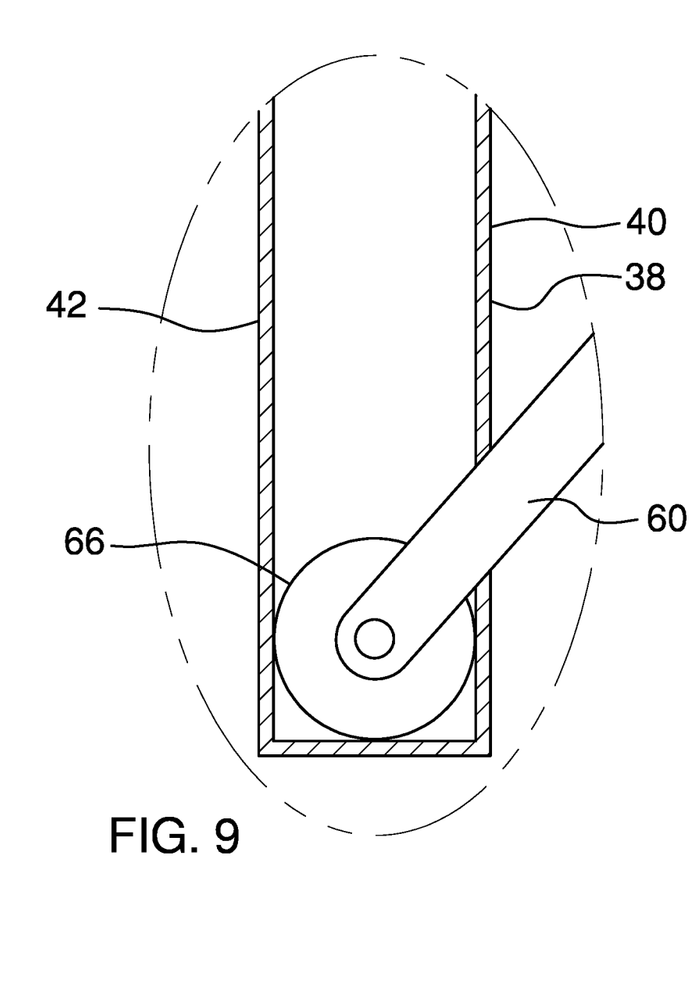
FIG. 9 is a detail view taken from circle 9 of FIG. 3 of an embodiment of the disclosure.

With reference now to the drawings, and in particular to FIGS. 1 through 9 thereof, a new deflection device embodying the principles and concepts of an embodiment of the disclosure and generally designated by the reference numeral 10 will be described.

As best illustrated in FIGS. 1 through 9, the wind deflection assembly 10 generally comprises a housing 12 that is mounted to a sidewall 14 of a semi-trailer 16. The housing 12 is positioned adjacent to a roof 18 of the semi-trailer 16 and the housing 12 has a first end 20, a second end 22 and an outer wall 24 extending between the first end 20 and the second end 22. Furthermore, the housing 12 is elongated between the first end 20 and the second end 22 to a length which matches a length of the sidewall 14 of the semi-trailer 16. The outer wall 24 has a bottom side 26 and the bottom side 26 is open.

A first track 28 is provided and the first track 28 is attached to the sidewall 14 of the semi-trailer 16. The first track 28 has a front side 30, a back side 32 and a first lateral side 34 extending between the front side 30 and the back side 32, and the first lateral side 34 is open. The first track 28 extends between the bottom side 26 of the housing 12 and a floor 36 of the semi-trailer 16 and the first track 28 is aligned with a front end 37 of the semi-trailer 16. A second track 38 is provided and the second track 38 is attached to the sidewall 14 of the semi-trailer 16. The second track 38 has a forward side 40, a rear side 42 and a first sidelong side 44 extending between the forward side 40 and the rear side 42, and the first sidelong side 44 is open. The second track 38 extends between the bottom side 26 of the housing 12 and the floor 36 of the semi-trailer 16, and the second track 38 is aligned with a rear end of the semi-trailer 16.

A curtain 46 is movably disposed in the housing 12 and the curtain 46 is comprised of a plurality of hinged sections 48. The curtain 46 is positionable in a collapsed position having the plurality of hinged sections 48 being folded onto each other such that the curtain 46 is contained within the housing 12 thereby exposing the sidewall 14 of the semi-trailer 16. The curtain 46 is positionable in a deployed position having the plurality of hinged sections 48 being oriented at an angle with an adjacent one of the hinged sections 48 having the curtain 46 extending downwardly out of the housing 12. Furthermore, the curtain 46 extends downwardly along a full height of the sidewall 14 of the semi-trailer 16 thereby facilitating each of the hinged sections 48 to deflect wind at an angle with the sidewall 14 of the semi-trailer 16. In this way the curtain 46 can inhibit the semi-trailer 16 from being blown over due to being exposed to a straight line lateral wind.

Each of the hinged sections 48 has a first end 50 and a second end 52, and each of the hinged sections 48 is elongated between the first end 50 and the second end 52. Each of the hinged sections 48 has a top edge 54 extending between the first end 50 and the second end 52, and each of the hinged sections 48 has a bottom edge 56 extending between the first end 50 and the second end 52. The plurality of hinged sections 48 includes a top hinged section 58, a bottom hinged section 60 and a set of middle hinged sections 62 each being positioned between the top hinged section 58 and the bottom hinged section 60. Each of the hinged sections 48 is comprised of a rigid material, such as steel, aluminum or other similar material that is capable of resisting being deformed by wind.

The top edge 54 of each of the middle hinged sections 62 is hingedly coupled to the bottom edge 56 of an adjacent one of the middle hinged sections 62. Additionally, the bottom edge 56 of each of the middle hinged sections 62 is hingedly coupled to the top edge 54 of an adjacent one of the middle hinged sections 62. The bottom edge 56 of the top hinged section 58 is hingedly coupled to a respective one of the middle hinged sections 62 and the top edge 54 of the bottom hinged section 60 is hingedly coupled to a respective one of the middle hinged sections 62.

A first roller 64 is provided and the first roller 64 is rotatably coupled to the first end 50 of the bottom hinged section 60. The first roller 64 is positioned between the front side 30 and the back side 32 of the first track 28 having the first end 50 of the bottom hinged section 60 being positioned adjacent to the first lateral side 34 of the first track 28. Furthermore, the first roller 64 travels upwardly and downwardly in the first track 28 when the curtain 46 is positioned between the collapsed position and the deployed position. A second roller 66 is provided and the second roller 66 is rotatably coupled to the second end 52 of the bottom hinged section 60. The second roller 66 is positioned between the forward side 40 and the rear side 42 of the second track 38 having the second end 52 of the bottom hinged section 60 being positioned adjacent to the first sidelong side 44 of the second track 38. The second roller 66 travels upwardly and downwardly in the second track 38 when the curtain 46 is positioned between the collapsed position and the deployed position.

A receiver 68 is coupled to the first roller 64, the receiver 68 has an upper side 70 and a lower side 72, and the receiver 68 has an opening 74 extending through the upper side 70 and the lower side 72. Furthermore, the opening 74 has a bounding surface 76 that is threaded and the receiver 68 is oriented such that a vertical axis of the first track 28 extends through the upper side 70 and the lower side 72. As is most clearly shown in FIG. 7, an armature 78 may be pivotally coupled between the receiver 68 and the first roller 64.

A deploying mechanism 80 is provided and the deploying mechanism 80 is movably integrated into the housing 12. The deploying mechanism 80 is actuatable into a deploying condition or a retracting condition, and the deploying mechanism 80 is in mechanical communication with the curtain 46. The curtain 46 is urged in to the deployed position when the deploying mechanism 80 is actuated into the deploying condition. Conversely, the curtain 46 is urged into the collapsed position when the deploying mechanism 80 is actuated into the retracting condition.

The deploying mechanism 80 comprises a screw 82 that is disposed within the first track 28. The screw 82 extends between the bottom side 26 of the housing 12 and a point located adjacent to the floor 36 of the semi-trailer 16. The screw 82 has an outer surface 84 that is threaded and the screw 82 extends through the opening 74 in the receiver 68 having the outer surface 84 threadably engaging the bounding surface of the opening 74 in the receiver 68. The screw 82 is rotatable in a first direction or a second direction. The receiver 68 travels downwardly along the screw 82 when the screw 82 is rotated in the first direction thereby urging the curtain 46 into the deployed position. Conversely, the receiver 68 travels upwardly along the screw 82 when the screw 82 is rotated in the second direction thereby urging the curtain 46 into the collapsed position.

The screw 82 has an upper end 86 that is positioned adjacent to the bottom side 26 of the housing 12. The deploying mechanism 80 includes a first gear 88 that is coupled to the upper end 86 of the screw 82. The first gear 88 has a distal end 90 with respect to the upper end 86 of the screw 82, an outside surface 92 tapering between the upper end 86 of the screw 82 and the distal end of the first gear 88, and the outside surface 92 comprises a plurality of teeth 94. The deploying mechanism 80 includes a crank 96 that has a primary end 98 and the crank 96 extends through the outer wall 24 of the housing 12 having the primary end 97 being positioned within the housing 12. The crank 96 can be manipulated for rotating the crank 96 in a first direction or a second direction.

The deploying mechanism 80 includes a second gear 98 that is coupled to the primary end 97 of the crank 96. The second gear 98 has a distal end 100 with respect to the primary end 97 of the crank 96, an exterior surface 102 tapering between the primary end 98 of the crank 96 and the distal end 100 of the second gear 98, and the exterior surface 102 comprises a plurality of teeth 104. The teeth 104 on the exterior surface 102 engage the teeth 94 on the outside surface 92 of the first gear 88. The screw 82 rotates in the first direction when the crank 96 is rotated in the first direction and the screw 82 rotates in the second direction when the crank 96 is rotated in the second direction. The housing 12, the first track 28, the second track 38, the curtain 46 and the deploying mechanism 80 are present on each of the sidewalls 14 of the semi-trailer 16 and the deploying mechanism 80 on each of the sidewalls 14 can be operated independently from each other. Furthermore, the curtain 46 on a respective sidewall 14 of the semi-trailer 16 is urged into the deployed position when the respective sidewall 14 is exposed to a strong wind that will strike the respective sidewall 14 at an approximately perpendicular angle.

In use, the crank 96 is rotated in the second direction to urge the curtain 46 into the collapsed position thereby storing the curtain 46 the housing 12. Conversely, the crank 96 is rotated in the first direction to urge the curtain 46 into the deployed position thereby facilitating the curtain 46 to extend downwardly along the full height of the sidewall 14 of the semi-trailer 16. In this way the hinged portions of the curtain 46 form a saw-tooth pattern that facilitates wind that would otherwise strike the sidewall 14 at an approximately perpendicular angle to be deflected at an acute angle. Thus, the semi-trailer 16 is inhibited from being tipped over due to being exposed to strong winds that strike the sidewall 14 of the semi-trailer 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wind deflection assembly for deploying on a side of a semi-trailer for inhibiting the semi-trailer from being tipped over due to high winds, said assembly comprising:
   a housing being mounted to a sidewall of a semi-trailer, said housing being positioned adjacent to a roof of the semi-trailer;
   a curtain being movably disposed in said housing, said curtain being comprised of a plurality of hinged sections, said curtain being positionable in a collapsed position having said plurality of hinged sections being folded onto each other such that said curtain is contained within said housing thereby exposing the sidewall of the semi-trailer, said curtain being positionable in a deployed position having said plurality of hinged sections being oriented at an angle with an adjacent one of said hinged sections having said curtain extending downwardly out of said housing such that said curtain extends downwardly along a full height of the sidewall of the semi-trailer thereby facilitating each of said hinged sections to deflect wind at an angle with the sidewall of the semi-trailer wherein said curtain is configured to inhibit the semi-trailer from being blown over due to being exposed to a straight line lateral wind; and
   a deploying mechanism being movably integrated into said housing, said deploying mechanism being actuatable into a deploying condition or a retracting condition, said deploying mechanism being in mechanical communication with said curtain, said curtain being urged in to said deployed position when said deploying mechanism is actuated into said deploying condition, said curtain being urged into said collapsed position when said deploying mechanism is actuated into said retracting condition.

2. The assembly according to claim 1, wherein:
said housing has a first end, a second end and an outer wall extending between said first end and said second end, said housing being elongated between said first end and said second end to a length which matches a length of the sidewall of the semi-trailer, said outer wall having a bottom side, said bottom side being open;
said assembly includes a first track being attached to the sidewall of the semi-trailer, said first track having a front side, a back side and a first lateral side extending between said front side and said back side, said first lateral side being open, said first track extending between said bottom side of said housing and a floor of the semi-trailer, said first track being aligned with a front end of the semi-trailer; and
said assembly includes a second track being attached to the sidewall of the semi-trailer, said second track having a forward side, a rear side and a first sidelong side extending between said forward side and said rear side, said first sidelong side being open, said second track extending between said bottom side of said housing and the floor of the semi-trailer, said second track being aligned with a rear end of the semi-trailer.

3. The assembly according to claim 1, wherein:
each of said hinged sections of said curtain has a first end and a second end, each of said hinged sections being elongated between said first end and said second end, each of said hinged sections having a top edge extending between said first end and said second end, each of said hinged sections having a bottom edge extending between said first end and said second end;
said plurality of hinged sections includes a top hinged section, a bottom hinged section and a set of middle hinged sections each being positioned between said top hinged section and said bottom hinged section;
said top edge of each of said middle hinged sections is hingedly coupled to said bottom edge of an adjacent one of said middle hinged sections;
said bottom edge of each of said middle hinged sections is hingedly coupled to said top edge of an adjacent one of said middle hinged sections;
said bottom edge of said top hinged section is hingedly coupled to said top edge of a respective one of said middle hinged sections; and said top edge of said bottom hinged section is hingedly coupled to said bottom edge of a respective one of said middle hinged sections.

4. The assembly according to claim 3, further comprising:
a first track being attached to the sidewall of the semi-trailer, said first track having a front side, a back side and a first lateral side extending between said front side and said back side, said first lateral side being open; and
a first roller being rotatably coupled to said first end of said bottom hinged section, said first roller being positioned between said front side and said back side of said first track having said first end of said bottom hinged section being positioned adjacent to said first lateral side of said first track, said first roller travelling upwardly and downwardly in said first track when said curtain is positioned between said collapsed position and said deployed position.

5. The assembly according to claim 4, further comprising:
a second track being attached to the sidewall of the semi-trailer, said second track having a forward side, a rear side and a first sidelong side extending between said forward side and said rear side, said first sidelong side being open; and
a second roller being rotatably coupled to said second end of said bottom hinged section, said second roller being positioned between said forward side and said rear side of said second track having said second end of said bottom hinged section being positioned adjacent to said first sidelong side of said second track, said second roller travelling upwardly and downwardly in said second track when said curtain is positioned between said collapsed position and said deployed position.

6. The assembly according to claim 4, further comprising a receiver being coupled to said first roller, said receiver having an upper side and a lower side, said receiver having an opening extending through said upper side and said lower side, said opening having a bounding surface being threaded, said receiver being oriented such that a vertical axis of said first track extends through said upper side and said lower side.

7. The assembly according to claim 6, wherein:
said deploying mechanism comprises a screw being disposed within said first track, said screw extending between a bottom side of said housing and a point located adjacent to the floor of the semi-trailer, said screw having an outer surface being threaded, said screw extending through said opening in said receiver having said outer surface threadably engaging said bounding surface of said opening in said receiver;
said screw is rotatable in a first direction or a second direction;
said receiver travels downwardly along said screw when said screw is rotated in said first direction thereby urging said curtain into said deployed position;
said receiver travels upwardly along said screw when said screw is rotated in said second direction thereby urging said curtain into said collapsed position;
said screw has an upper end being positioned adjacent to said bottom side of said housing.

8. The assembly according to claim 7, wherein said deploying mechanism includes a first gear being coupled to said upper end of said screw, said first gear having a distal end with respect to said upper end of said screw and an outside surface tapering between said upper end of said screw and said distal end of said first gear, said outside surface comprising a plurality of teeth.

9. The assembly according to claim 8, wherein said deploying mechanism includes a crank having a primary end, said crank extending through said outer wall of said housing having said primary end being positioned within said housing thereby facilitating said crank to be manipulated for rotating said crank in a first direction or a second direction.

10. The assembly according to claim 9, wherein:
said deploying mechanism includes a second gear being coupled to said primary end of said crank, said second gear having a distal end with respect to said primary end of said crank and an exterior surface tapering between said primary end of said crank and said distal end of said second gear, said exterior surface comprising a plurality of teeth;
said teeth on said exterior surface engage said teeth on said outside surface of said first gear;
said screw rotates in said first direction when said crank is rotated in said first direction; and
said screw rotates in said second direction when said crank is rotated in said second direction.

11. A wind deflection assembly for deploying on a side of a semi-trailer for inhibiting the semi-trailer from being tipped over due to high winds, said assembly comprising:
a housing being mounted to a sidewall of a semi-trailer, said housing being positioned adjacent to a roof of the semi-trailer, said housing having a first end, a second end and an outer wall extending between said first end and said second end, said housing being elongated between said first end and said second end to a length which matches a length of the sidewall of the semi-trailer, said outer wall having a bottom side, said bottom side being open;
a first track being attached to the sidewall of the semi-trailer, said first track having a front side, a back side and a first lateral side extending between said front side and said back side, said first lateral side being open, said first track extending between said bottom side of said housing and a floor of the semi-trailer, said first track being aligned with a front end of the semi-trailer;
a second track being attached to the sidewall of the semi-trailer, said second track having a forward side, a rear side and a first sidelong side extending between said forward side and said rear side, said first sidelong side being open, said second track extending between said bottom side of said housing and the floor of the semi-trailer, said second track being aligned with a rear end of the semi-trailer;
a curtain being movably disposed in said housing, said curtain being comprised of a plurality of hinged sections, said curtain being positionable in a collapsed position having said plurality of hinged sections being folded onto each other such that said curtain is contained within said housing thereby exposing the sidewall of the semi-trailer, said curtain being positionable in a deployed position having said plurality of hinged sections being oriented at an angle with an adjacent one of said hinged sections having said curtain extending downwardly out of said housing such that said curtain extends downwardly along a full height of the sidewall of the semi-trailer thereby facilitating each of said hinged sections to deflect wind at a angle with the sidewall of the semi-trailer wherein said curtain is configured to inhibit the semi-trailer from being blown over due to being exposed to a straight line lateral wind, each of said hinged sections having a first end and a second end, each of said hinged sections being elongated between said first end and said second end, each of said hinged sections having a top edge extending between said first end and said second end, each of said hinged sections having a bottom edge extending between said first end and said second end, said plurality of hinged sections including a top hinged section, a bottom hinged section and a set of middle hinged sections each being positioned between said top hinged section and said bottom hinged section, said top edge of each of said middle hinged sections being hingedly coupled to a bottom edge of an adjacent one of said middle hinged sections, said bottom edge of each of said middle hinged sections being hingedly coupled to said top edge of an adjacent one of said middle hinged sections, said bottom edge of said top hinged section being hingedly coupled to said top edge of a respective one of said middle hinged sections, said top edge of said bottom hinged section being hingedly coupled to said bottom edge of a respective one of said middle hinged sections;

a first roller being rotatably coupled to said first end of said bottom hinged section, said first roller being positioned between said front side and said back side of said first track having said first end of said bottom hinged section being positioned adjacent to said first lateral side of said first track, said first roller travelling upwardly and downwardly in said first track when said curtain is positioned between said collapsed position and said deployed position;

a second roller being rotatably coupled to said second end of said bottom hinged section, said second roller being positioned between said forward side and said rear side of said second track having said second end of said bottom hinged section being positioned adjacent to said first sidelong side of said second track, said second roller travelling upwardly and downwardly in said second track when said curtain is positioned between said collapsed position and said deployed position;

a receiver being coupled to said first roller, said receiver having an upper side and a lower side, said receiver having an opening extending through said upper side and said lower side, said opening having a bounding surface being threaded, said receiver being oriented such that a vertical axis of said first track extends through said upper side and said lower side;

a deploying mechanism being movably integrated into said housing, said deploying mechanism being actuatable into a deploying condition or a retracting condition, said deploying mechanism being in mechanical communication with said curtain, said curtain being urged in to said deployed position when said deploying mechanism is actuated into said deploying condition, said curtain being urged into said collapsed position when said deploying mechanism is actuated into said retracting condition, said deploying mechanism comprising:

a screw being disposed within said first track, said screw extending between said bottom side of said housing and a point located adjacent to the floor of the semi-trailer, said screw having an outer surface being threaded, said screw extending through said opening in said receiver having said outer surface threadably engaging said bounding surface of said opening in said receiver, said screw being rotatable in a first direction or a second direction, said receiver travelling downwardly along said screw when said screw is rotated in said first direction thereby urging said curtain into said deployed position, said receiver travelling upwardly along said screw when said screw is rotated in said second direction thereby urging said curtain into said collapsed position, said screw having an upper end being positioned adjacent to said bottom side of said housing;

a first gear being coupled to said upper end of said screw, said first gear having a distal end with respect to said upper end of said screw and an outside surface tapering between said upper end of said screw and said distal end of said first gear, said outside surface comprising a plurality of teeth;

a crank having a primary end, said crank extending through said outer wall of said housing having said primary end being positioned within said housing thereby facilitating said crank to be manipulated for rotating said crank in a first direction or a second direction; and a second gear being coupled to said primary end of said crank, said second gear having a distal end with respect to said primary end of said crank and an exterior surface tapering between said primary end of said crank and said distal end of said second gear, said exterior surface comprising a plurality of teeth, said teeth on said exterior surface engaging said teeth on said outside surface of said first gear, said screw rotating in said first direction when said crank is rotated in said first direction, said screw rotating in said second direction when said crank is rotated in said second direction.

\* \* \* \* \*